United States Patent

[11] 3,614,580

[72] Inventor Kunihiko Eto
Kariya-shi, Japan
[21] Appl. No. 888,644
[22] Filed Dec. 29, 1969
[45] Patented Oct. 19, 1971
[73] Assignee Toyoda Koki Kabushiki Kaisha
Aichi-ken, Japan
[32] Priority Dec. 29, 1968
[33] Japan
[31] 43/795/69

[54] PULSE MOTOR DRIVE SYSTEMS
4 Claims, 7 Drawing Figs.

[52] U.S. Cl. .......... 318/696, 307/223
[51] Int. Cl. .......... G05b 19/40
[50] Field of Search .......... 307/223; 318/138, 234, 696, 685; 328/106

[56] References Cited

UNITED STATES PATENTS

| | | | |
|---|---|---|---|
| 3,112,433 | 11/1963 | Fairbanks | 318/138 X |
| 3,312,885 | 4/1967 | Falk et al. | 318/138 X |
| 3,354,367 | 11/1967 | Stockebrand | 318/138 |
| 3,436,631 | 4/1969 | Faure | 318/138 |
| 3,443,181 | 5/1969 | Kozol et al. | 318/138 |
| 3,467,902 | 9/1969 | Shimizu et al. | 318/138 |
| 3,508,130 | 4/1970 | Van Buskirk | 318/138 |

*Primary Examiner*—G. R. Simmons
*Attorney*—Ward, McElhannon, Brooks & Fitzpatrick

ABSTRACT: The pulse motor drive system comprises a plurality of flip-flop circuits connected in an endless chain, each of the flip-flop circuits including a pair of input terminals and a pair of output terminals. At least one output terminal of each flip-flop circuit is connected to the input terminals of the flip-flop circuits on both sides thereof through gate circuits. The initial state of output signals for output terminals of all flip-flop circuits are determined by a reset signal and the state thus determined is shifted one by one by trigger pulses. Output conductors are connected between output terminals of every other flip-flop circuits and a conventional pulse motor to energize coils thereof in a predetermined order.

Fig. 2

| 〒 Trigger Pals \ FF output signal | $Q_1$ | $Q_2$ | $Q_3$ | $Q_4$ | $Q_5$ | $Q_6$ | $Q_7$ | $Q_8$ | $Q_9$ | $Q_{10}$ |
|---|---|---|---|---|---|---|---|---|---|---|
| (Reset) | 1 | 1 | 1 | 1 | 1 | 0 | 0 | 0 | 0 | 0 |
| NO. 1 | 0 | 1 | 1 | 1 | 1 | 1 | 0 | 0 | 0 | 0 |
| NO. 2 | 0 | 0 | 1 | 1 | 1 | 1 | 1 | 0 | 0 | 0 |
| NO. 3 | 0 | 0 | 0 | 1 | 1 | 1 | 1 | 1 | 0 | 0 |
| NO. 4 | 0 | 0 | 0 | 0 | 1 | 1 | 1 | 1 | 1 | 0 |
| NO. 5 | 0 | 0 | 0 | 0 | 0 | 1 | 1 | 1 | 1 | 1 |
| NO. 6 | 1 | 0 | 0 | 0 | 0 | 0 | 1 | 1 | 1 | 1 |
| NO. 7 | 1 | 1 | 0 | 0 | 0 | 0 | 0 | 1 | 1 | 1 |
| NO. 8 | 1 | 1 | 1 | 0 | 0 | 0 | 0 | 0 | 1 | 1 |
| NO. 9 | 1 | 1 | 1 | 1 | 0 | 0 | 0 | 0 | 0 | 1 |
| NO. 10 | 1 | 1 | 1 | 1 | 1 | 0 | 0 | 0 | 0 | 0 |

Fig. 3

| 〒 Trigger Pals \ FF output signal | I | II | III | IV | V |
|---|---|---|---|---|---|
| (Reset) | 1 | 1 | 1 | 0 | 0 |
| NO. 1 | 0 | 1 | 1 | 0 | 0 |
| NO. 2 | 0 | 1 | 1 | 1 | 0 |
| NO. 3 | 0 | 0 | 1 | 1 | 0 |
| NO. 4 | 0 | 0 | 1 | 1 | 1 |
| NO. 5 | 0 | 0 | 0 | 1 | 1 |
| NO. 6 | 1 | 0 | 0 | 1 | 1 |
| NO. 7 | 1 | 0 | 0 | 0 | 1 |
| NO. 8 | 1 | 1 | 0 | 0 | 1 |
| NO. 9 | 1 | 1 | 0 | 0 | 0 |
| NO. 10 | 1 | 1 | 1 | 0 | 0 |

Fig. 4

| 〒 Trigger Pals \ FF output signal | $Q_1$ | $Q_2$ | $Q_3$ | $Q_4$ | $Q_5$ | $Q_6$ | $Q_7$ | $Q_8$ | $Q_9$ | $Q_{10}$ |
|---|---|---|---|---|---|---|---|---|---|---|
| (Reset) | 1 | 1 | 1 | 1 | 1 | 0 | 0 | 0 | 0 | 0 |
| NO. 1 | 1 | 1 | 1 | 1 | 0 | 0 | 0 | 0 | 0 | 1 |
| NO. 2 | 1 | 1 | 1 | 0 | 0 | 0 | 0 | 0 | 1 | 1 |
| NO. 3 | 1 | 1 | 0 | 0 | 0 | 0 | 0 | 1 | 1 | 1 |
| NO. 4 | 1 | 0 | 0 | 0 | 0 | 0 | 1 | 1 | 1 | 1 |
| NO. 5 | 0 | 0 | 0 | 0 | 0 | 1 | 1 | 1 | 1 | 1 |
| NO. 6 | 0 | 0 | 0 | 0 | 1 | 1 | 1 | 1 | 1 | 0 |
| NO. 7 | 0 | 0 | 0 | 1 | 1 | 1 | 1 | 1 | 0 | 0 |
| NO. 8 | 0 | 0 | 1 | 1 | 1 | 1 | 1 | 0 | 0 | 0 |
| NO. 9 | 0 | 1 | 1 | 1 | 1 | 1 | 0 | 0 | 0 | 0 |
| NO. 10 | 1 | 1 | 1 | 1 | 1 | 0 | 0 | 0 | 0 | 0 |

Fig. 5

| 〒 Trigger Pals \ FF output signal | I | II | III | IV | V |
|---|---|---|---|---|---|
| (Reset) | 1 | 1 | 1 | 0 | 0 |
| NO. 1 | 1 | 1 | 0 | 0 | 0 |
| NO. 2 | 1 | 1 | 0 | 0 | 1 |
| NO. 3 | 1 | 0 | 0 | 0 | 1 |
| NO. 4 | 1 | 0 | 0 | 1 | 1 |
| NO. 5 | 0 | 0 | 0 | 1 | 1 |
| NO. 6 | 0 | 0 | 1 | 1 | 1 |
| NO. 7 | 0 | 0 | 1 | 1 | 0 |
| NO. 8 | 0 | 1 | 1 | 1 | 0 |
| NO. 9 | 0 | 1 | 1 | 0 | 0 |
| NO. 10 | 1 | 1 | 1 | 0 | 0 |

PULSE MOTOR DRIVE SYSTEMS

This invention relates to a novel pulse motor drive system for controlling the direction of rotation thereof by means of flip-flop circuits and gate circuits.

It is an object of this invention to provide a novel pulse motor drive system to control the direction of rotation thereof by alternately energizing *m*phase coil or coils and $(m+1)$ phase coils of the motor, where *m*represents a natural number selected such that $(2m+1)$ is equal to the number of phase coils of the pulse motor.

Another object of this invention is to provide a pulse motor drive system which readily enables to change the direction of rotation of the motor from forward to reverse or vice versa.

Still another object of this invention is to provide an improved pulse motor drive system which is reliable in operation and simple in construction.

To accomplish these and other objects in accordance with this invention, a plurality of identical flip-flop circuits are connected in an endless chain, each flip-flop circuit being provided with an input terminal, a complementary input terminal, an output terminal, and a complementary input terminal. The output terminal or both output terminals of each one of the flip-flop circuits are connected to both input terminals, i.e. input terminals and complementary input terminals of the flip-flop circuits situated on both sides thereof. Conductors of lead wires are connected to the output terminals of every other flip-flop circuits so as to energize selected coils of the pulse motor in a predetermined order. A reset signal operates to set a first half of flip-flop circuits and to reset a second half of the flip-flop circuits so that the former produces binary output signals "1" at respective output terminals and the latter produces binary output signals "0" at respective output terminals. Ever trigger pulse operates to reverse one flip-flop circuit in the first half and one flip-flop circuit in the second half in such a manner that successive halves of the flip-flop produce signals "1" at the output terminals while the other successive halves produce signals "0" at the output terminals.

In the accompanying drawings:

FIG. 2 is a chart showing output signals provided by respective flip-flop circuits in the pulse motor drive system when forward drive signals are applied thereto;

FIG. 3 is a chart showing output signals supplied to the pulse motor when forward drive signals are applied to the pulse motor drive system shown in FIG. 1;

FIG. 4 is a chart showing output signals provided by respective flip-flop circuits in the pulse motor drive system shown in FIG. 1 when reverse drive signals are applied thereto;

FIG. 5 is a similar chart showing output signals supplied to the pulse motor when reverse drive signals are applied to the pulse motor drive system shown in FIG. 1;

Generally, the present invention relates to a pulse motor drive system adapted to control a pulse motor provided with *n* stators and *n* rotor blocks which are individually magnetized by respective coils where *n* is a natural number equal to three or more.

Figure 1:
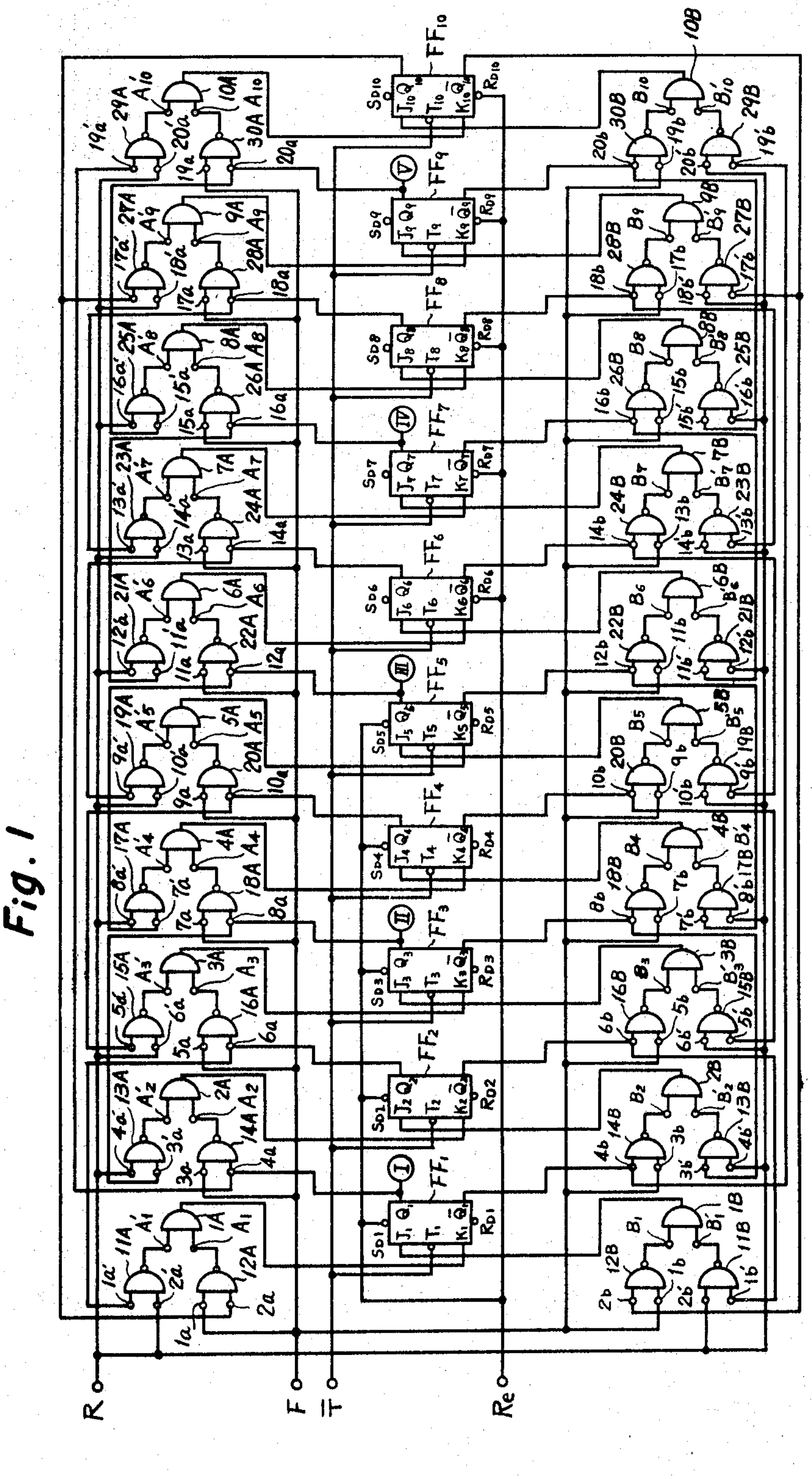
FIG. 1 is a block diagram of a first embodiment of a pulse motor drive system embodying this invention.
Figure 6:
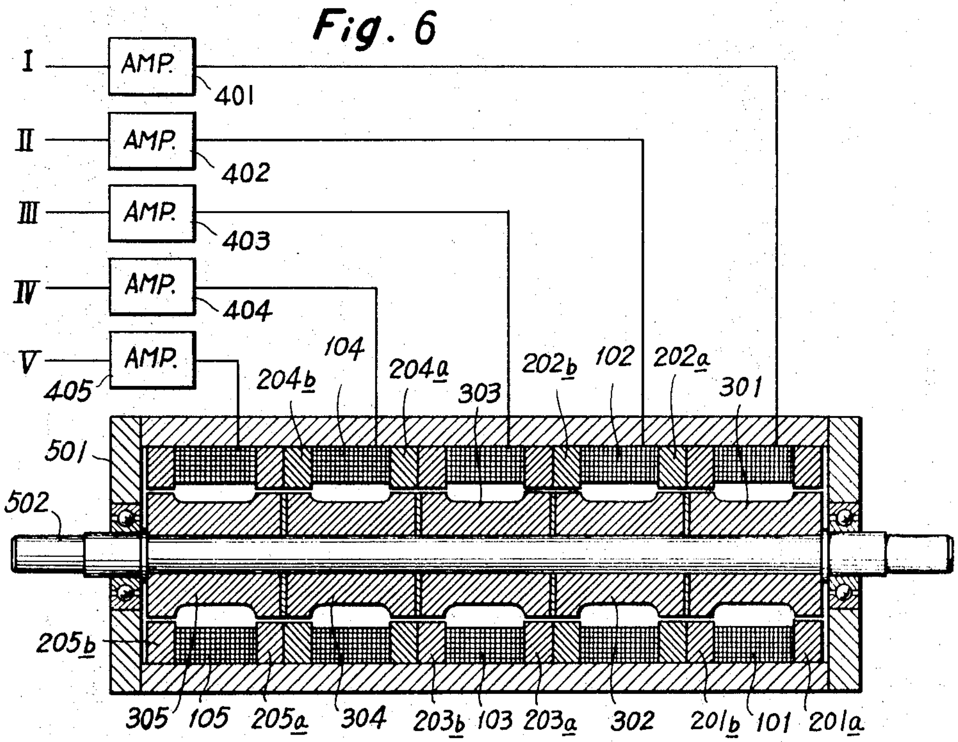
FIG. 6 shows a longitudinal section of a conventional pulse motor driven by the pulse motor drive system shown in FIG. 1.

Referring now to FIG. 1 of the accompanying drawings, there is shown a first embodiment of a pulse motor drive system of this invention adapted to control the direction of rotation of a conventional motor provided with five coils, five rotor blocks and five pairs of stators as shown in FIG. 6 wherein two coils and three coils are alternately energized to provide a half-pitch drive. Flip-flop circuits $FF_1$ through $FF_{10}$ inclusive are provided with output terminals $Q_1$ thorugh$Q_{10}$ complementary output terminals $\overline{Q}_1$ through $\overline{Q}_{10}$, input terminals $J_1$ through $H_{10}$ , complementary input terminals $K_1$ through $K_{10}$ , set terminals $SD_1$ through $SD_{10}$ , reset terminals $RD_1$ through $RD_{10}$ and trigger terminals $T_1$ through $T_{10}$ , respectively. Each of these flip-flop circuits has the same construction and operates identically. For the sake of brevity, hereinafter it is referred to as a "J-K flip-flop." The operation of the J-K flip-flop will be described with reference to the first J-K flip-flop $FF_1$ . This J-K flip-flop $FF_1$ generates output "1" and "0" at the respective output terminals $Q_1$ and $\overline{Q}_1$ when a trigger pulse is applied to trigger terminal $T_1$ where input signals "1" and "0" are being applied to input terminals $J_1$ and $K_1$, respectively. The first J-K flip-flop $FF_1$ also generates outputs "0" and "1" at output terminals $Q_1$ and $\overline{Q}_1$, respectively, in response to the application of a trigger pulse to trigger terminal $T_1$ where input signals "0" and "1" are being applied to input terminals $J_1$ and $K_1$, respectively. Furthermore, when input signals are not applied to both input terminals $J_1$ and $K_1$ the first J-K flip-flop will not change the outputs from output terminals $Q_1$ and $\overline{Q}_1$ even if a trigger pulse is applied to trigger terminal $T_1$. In this specification input and output signals, etc. are represented by a binary code system so that a higher or significant voltage and a lower or zero voltage are expressed by a binary "1" and a binary "0," respectively. A forward signal input conductor F for passing forward drive signals is connected to input terminals *1a, 3a, 5a, 7a, 9a, 11a, 13a, 15a, 17a* and *19a* of respective NAND circuits 12A, 14A, 16A, 18A, 20A, 22A, 24A, 26A, 28A, and 30A. Forward signal input conductor F is also connected to input terminals *1b 3b, 5b 7b, 9b, 11b, 13b, 15b, 17b* and *19b* of respective NAND circuits 12B, 14B, 16B, 18B, 20B, 22B, 24B, 26B, 28B and 30B. Input terminals *1a, 3a, 5a, 7a, 9a, 11a, 13a, 15a, 17a* and *19a* and input terminals *b, 3b, 5b, 7b, 9b, 11b, 13b, 15b, 17b* and *19b* are referred to as odd input terminals. The NAND circuits 12A, 14A, 16A, 18A, 20A, 22A, 24A, 26A, 28A and 30A and NAND circuits 12B, 14B 16B, 18B, 20B, 22B, 26B, 28B and 30B are herein referred to as AE-NAND circuits and BE-NAND circuits, respectively. The terms odd, "AE" and "BE" do not have any significant meanings but are used to distinguish them from each other. A reverse signal input conductor R for passing reverse drive signals is connected to input terminals *2a'4a '6a'8a'10a'12a'14a'16a'18a'*and *20a'*of NAND circuits 11A, 13A, 15A, 17A, 19A, 21A, 23A, 25A, 27A and 29A, respectively. Input conductor R is further connected to input terminals *2b'4b'6b'8b '10b'12b'14b'16b'18b'*and *20b'*of respective NAND circuits 11B, 13B, 15B, 17B, 19B, 21B, 23B, 25B, 27B and 29B. Input terminals *2a'4a'6a'8a'10a ' 12a' 14a' 16a' 18a'* and *20a'*; *2b', 4b', 6b'8b'10b'12B'14b'16b' 18b'*, and *20b'*; NAND circuits 11A, 13A, 15A, 17A, 19A, 21A, 23A, 25A, 27A, and 29A; and NAND circuits 11B, 13B, 15B, 17B, 19B, 21B, 23B, 25B, 27B and 29B are hereinafter referred to as "even input terminals," "AU-NAND circuits" and "BU-NAND circuits," respectively. Again the "even," "AU" and "BU" do not have any significant meanings but are used to distinguish them from each other. Each one of all AE, AU, BE and BU-NAND circuits having quite identical operation and construction produces signals "0" only at the time when signals "1" are applied simultaneously to their even and odd terminals whereas each produces signals "1 " when a signal"1" is applied to their even or odd input terminals or when signals "1 " are not applied to both of their input terminals.

Output terminals provided for the AE-NAND circuits are respectively connected to input terminals $A_1$, $A_2$ , $A_3$, $A_4$ , $A_5$ , $A_6$ , $A_7$ , $A_8$ , $A_9$ and $A_{10}$ of AND circuits 1-A, 2A, 3A, 4A, 5A, 6A, 7A, 8A, 9A and 10A which are herein termed as A-AND circuits. Output terminals provided for AU-NAND circuits are also connected to input terminals $A_1$'$A_2$'$A_3$ '$A_4$ '$A_5$ ', $A_6$', $A_7$ '$A_8$', $A_9$' and $A_{10}$' of the A-AND circuits, respectively. Output terminals provided for BE and BU-NAND circuits respectively connected to input terminals $B_1$ , $B_2$ , $B_3$ , $B_4$ , $B_5$ , $B_6$ , $B_7$ , $B_8$ , $B_9$ , and $B_{10}$ and to input terminals $B_1$ '$B_2$'$B_3$ '$B_4$ '$B_5$ '$B_6$ '$B_7$ '$B_8$ '$B_9$'and $B_{10}$', of AND circuits 1B, 2B, 3B, 4B, 5B, 6B, 7B, 8B, 9B, and 10B which are termed as B-AND circuits hereinafter. Output terminals of A-AND circuits and B-AND circuits are respectively connected to input terminals $K_1$, $K_2$ , $K_3$ , $K_4$ , $K_5$ , $K_6$ , $K_7$ , $K_8$ , $K_9$ , and $K_{10}$ and to the input terminals $J_1$ , $J_2$ , $J_3$ , $J_4$, $J_5$, $J_6$, $J_7$, $J_8$, $J_9$, and $J_{10}$ of J-K flip-flops $FF_1$, $FF_2$, $FF_3$, $FF_4$, $FF_5$, $FF_6$, $FF_7$, $FF_8$, $FF_9$, and $FF_{10}$. All A and B-AND circuits have identical construction and produce output signals "1" only when signals "1" are applied simultaneously to both of their input terminals. Output terminals -$Q_1$, $Q_2$, $Q_3$, $Q_4$, $Q_5$, $Q_6$, $Q_7$, $Q_8$, $Q_9$ and $Q_{10}$ of J-K flip-flops are connected to the even input terminals 4a, 6a, 8a, 10a, 12a, 14a, 16a, 18a, 20a and 2a of AE-NAND circuits, respectively. These even input terminals are also connected to odd input terminals 19a', 1a', 3a', 5a', 7a', 9a', 11a', 13a', 15a' and 17a' of AU-NAND circuits, respectively. The output terminals or complementary output terminals $\overline{Q}_1$, $\overline{Q}_2$, $\overline{Q}_3$, $\overline{Q}_4$, $\overline{Q}_5$, $\overline{Q}_6$, $\overline{Q}_7$, $\overline{Q}_8$, $\overline{Q}_9$ and $\overline{Q}_{10}$ of J-K flip-flops are respectively connected to even input terminals 4b, 6b, 8b, 10b, 12b, 14b, 16b, 18b, 20b and 2b of the BE-circuits, these complementary outputs being also connected to odd input terminals 19b', 1b', 3b', 5b', 7b', 9b', 11b', 13b', 15b' and 17b' of the BU-NAND circuits, respectively.

A reset signal input conductor Re for passing reset signals is connected to set terminals $SD_1$, $SD_2$, $SD_3$, $SD_4$ and $SD_5$ of J-K flip-flops $FF_1$, $FF_2$, $FF_3$, $FF_4$ and $FF_5$, respectively and also to reset terminals $RD_6$, $RD_7$, $RD_8$, $RD_9$ and $RD_{10}$ of the J-K flip-flops $FF_6$, $FF_7$, $FF_8$, $FF_9$ and $FF_{10}$.

A trigger pulse input conductor $\overline{T}$ for passing trigger signals or pulses is connected to trigger terminals $T_1$, $T_2$, $T_3$, $T_4$, $T_5$, $T_6$, $T_7$, $T_8$, $T_9$ and $T_{10}$ of J-K flip-flops, respectively. Output terminals $Q_1$, $Q_3$, $Q_5$, $Q_7$ and $Q_9$ are further connected to a conventional pulse motor through output conductors I, II, III, IV and V. These conductors are connected to respective coils 101, 102, 103, 104, and 105 of the pulse motor through respective amplifiers 401, 102, 103, 404 and 405, as shown in FIG. 6. The illustrated pulse motor comprises a housing 501, five pairs of stators 201a and 201b 202a, and 202b, 203a and 203b, 204a and 204b, 205a and 205b which are secured to the housing, five cylindrical wound coils 101, 102, 103, 104, and 105 interposed between respective stator pairs and a rotor including five rotor blocks 301, 302, 303, 304 and 305 which are magnetically isolated from each other and are mounted on a shaft 502 rotatably journaled by housing 501.

Upon application of a reset pulse on reset conductor Re, J-K flip-flops $FF_1$, $FF_2$, $FF_3$, $FF_4$, and $FF_5$ are set and the other J-K flip-flops $FF_6$, $FF_7$, $FF_8$, $FF_9$ and $FF_{10}$ are reset. In the set and reset conditions, output signals "1" are generated at output terminals $Q_1$, $Q_2$, $Q_3$, $Q_4$, $Q_5$, $\overline{Q}_6$, $\overline{Q}_7$, $\overline{Q}_8$, $\overline{Q}_9$ and $\overline{Q}_{10}$ of J-K flip-flops $FF_1$ through $FF_{10}$ inclusive and output signals "0" are generated at output terminals $\overline{Q}_1$, $\overline{Q}_2$, $\overline{Q}_3$, $\overline{Q}_4$, $\overline{Q}_5$, $Q_6$, $Q_7$, $Q_8$, $Q_9$ and $Q_{10}$ of these flip-flops. Thus, output signals "1" at output terminals $Q_1$, $Q_3$ and $Q_5$ are applied to three coils 101, 102 and 103 respectively through output conductors I, II and III whereby these three coils are energized to magnetize three pairs of the stators 201a and 201b, 202a and 202b, 203a and 203b and three rotor blocks 301, 302 and 303 corresponding to said three pairs of the stators. Furthermore, output signals "1" appearing at output terminals $Q_1$, $Q_2$, $Q_3$, $Q_4$, $Q_5$, $\overline{Q}_6$, $\overline{Q}_7$, $\overline{Q}_8$, $\overline{Q}_9$ and $\overline{Q}_{10}$ are furnished to even input terminals 4a, 6a, 8a, 10a and 12a of the even AE-NAND circuits and to even input terminals 14b, 16b, 18b, 20b and 2b of the BE-NAND circuits and thence to odd input terminals 19a', 1a', 3a', 5a' and 7a' of the AU-NAND circuits and to the odd input terminals 9b' 11b', 13b', 15b' and 17b' of the BU-NAND circuits. However, in the set and reset conditions, the input terminals connected to output terminals $\overline{Q}_1$, $\overline{Q}_2$, $\overline{Q}_3$, $\overline{Q}_4$, ,$\overline{Q}_5$, $Q_6$, $Q_7$, $Q_8$, $Q_9$ and $Q_{10}$, i.e. even input terminals 4b, 6b, 8b, 10b, and 12b of the BE-NAND circuits, the odd input terminals 19b', 1b', 3b', 5b' and 7b' of the BU-NAND circuits, even input terminals 14a, 16a, 18a, 20a and 2a of the AE-NAND circuits and odd input terminals 9a', 11a', 13a', 15a' and 17a of the AU-NAND circuits, are not supplied with any significant electric voltage so that output signals "0" or no significant voltage are generated thereat. Thus, A-AND circuits 1A, 2A, 3A, 4A, 5A, 6A, 7A, 8A, 9A and 10A generate output signals "1" which are applied to input terminals $K_1$, $K_2$, $K_3$, $K_4$, $K_5$, $K_6$, $K_7$, $K_8$, $K_9$ and $K_{10}$ of the J-K flip-flops since both of all AU-NAND circuits and all AE-NAND circuits generate output signals "1" since they are not simultaneously supplied with signals "1" at their even and odd input terminals.

B-AND circuits 1B, 2B, 3B, 4B, 5B, 6B, 7B, 8B, 9B and 10B also generate signals "1" which are supplied to input terminals $J_1$ through $J_{10}$ inclusive of J-K flip-flops since both of all BU-NAND circuits and BE-NAND circuits generate output signals "1" since they are not simultaneously supplied with signals "1" at their even and odd input terminals.

When an input signal "1" and an input signal "0" are applied to forward signal input conductor F and to reverse signal input conductor R, respectively, the input signal "1" is furnished to the odd input terminals of AE-NAND circuits 12A, 14A, 16A, 18A, 20A, 22A, 24A, 26A, 28A, and 30A and of BE-NAND circuits 12B, 14B, 16B, 18B, 20B, 22B, 24B, 26B, 28B and 30B through forward signal input conductor F, and input signal "0" is furnished to the even input terminals of AU-NAND circuits 11A, 13A, 15A, 17A, 19A, 21A, 23A, 25A, 27A and 29A and of BU-NAND circuits 11B, 13B, 15B, 17B, 19B, 21B, 23B, 25B, 27B and 29B through reverse signal input conductor R. Accordingly, AE-NAND circuits 14A, 16A, 18A, 20A and 22A and BE-NAND circuits 24B, 26B, 28B, 30B and 12B generate signals "0" since these NAND circuits are simultaneously supplied with signals "1" to their even and odd input terminals. Remaining NAND circuits, i.e. all AU-NAND circuits and BU-NAND circuits, AE-NAND circuits 24A, 26A, 28A, 30A and 12A and BE-NAND circuits 14B, 16B, 18B, 20B, 22B of the BE-NAND circuits, generate output signals "1" since they are not simultaneously supplied with signals "1" at both of their input terminals. Therefore A-AND circuits 2A, 3A, 4A, 5A and 6A and B-AND circuits 7B, 8B, 9B, 10B and 1B generate signal "0" and A-AND circuits 7A, 8A, 9A, 10A and 1A and B-AND circuits 2B, 3B, 4B, 5B, and 6B generate signals "1" to apply the signals "1" to the input terminals $K_1$, $J_2$, $J_3$, $J_4$, $J_5$, $J_6$, $K_7$, $K_8$, $K_9$ and $K_{10}$ of respective flip-flops $FF_1$, $FF_2$, $FF_3$, $FF_4$, $FF_5$, $FF_6$, $FF_7$, $FF_8$, $FF_9$ and $FF_{10}$ and to apply signals "0" to input terminals $J_1$, $K_2$, $K_3$, $K_4$, $K_5$, $K_6$, $J_7$, $J_8$, $J_9$ and $J_{10}$ thereof.

When a forward trigger pulse No. 1 (the term "forward trigger pulse" means a trigger pulse applied to trigger input conductor $\overline{T}$ when a forward signal is applied to forward signal input conductor F) is applied to trigger input terminals $T_1$ through $T_{10}$ inclusive J-K flip-flops $FF_1$ and $FF_6$ are switched or reversed thus generating output signals "1" at output terminals $\overline{Q}_1$ and $Q_6$ instead of output terminals $Q_1$ and $\overline{Q}_6$. But the other J-K flip-flops $FF_2$, $FF_3$, $FF_4$, $FF_5$, $FF_7$, $FF_8$, $FF_9$ and $FF_{10}$ are maintained in their previous state i.e. J-K flip-flops $FF_2$, $FF_3$, $FF_4$ and $FF_5$ are supplied with input signals "1" at their input terminals $J_2$, $J_3$, $J_4$ and $J_5$ to produce output signals "1" at their output terminals $Q_2$, $Q_3$, $Q_4$ and $Q_5$ and J-K flip-flops $FF_7$, $FF_8$, $FF_9$ and $FF_{10}$ are supplied with input signals "1" at their input terminals $K_7$, $K_8$, $K_9$ and $K_{10}$ to produce output signals "1" at their output terminals $\overline{Q}_7$, $\overline{Q}_8$, $\overline{Q}_9$ and $\overline{Q}_{10}$. Thus, output signals "1" to be supplied to the electric pulse motor are obtained at conductors II and III connected to output terminals $Q_3$ and $Q_5$ thus energizing coils 102 and 103. As the result, the signal "0" from output terminals $Q_1$ is supplied to odd input terminal 19a' of AU-NAND circuit 29A and to even input terminal 4a of AE-NAND circuit 14A. As a result, NAND circuit 14A changed its output signal from "0" to "1" since only a single signal "1" is supplied to the odd input terminal 3a from forward input conductor F. Thus, A-AND circuit 2A supplies a signal "1" to input terminal $K_2$, since AU-NAND circuit 13A continues to supply a signal "1" to A-AND circuit 2A. On the other hand, a signal "1" from output terminal $\overline{Q}_1$ is supplied to even input terminal 19b' of BU-NAND circuit 29B and to even input terminal 4b of BE-NAND circuit 14B whereby NAND circuit 14B changes its output signal from "1" to "0" since a signal "1" is supplied to odd input terminal 3b from the forward signal input conductor F. Thus B-AND circuit 2B supplies a signal "0" to input terminal $J_2$ since NAND circuit 13B continues to produce a signal "1." Similarly, as a result of the reversal of J-K flip-flop $FF_6$ a signal "1" from output terminal $\overline{Q}_6$ is supplied to odd input terminal 9*a'* of AU-NAND circuit 19A and to even input terminal 14*a* of AE-NAND circuit 24A causing this AE-NAND circuit 24A to change its output signal from "1" to "0" since the odd input terminal 13*a* of AE-NAND circuit 24A (after "0") is supplied with a signal "1" from forward input conductor F. Thus A-AND circuit 7A supplied a signal "0" to input terminal $K_7$ since the output of AU-NAND circuit 23A is still "0." On the other hand, the signal "0" from output terminal $\overline{Q}_6$ is supplied to odd input terminal 9*b'* of BU-NAND circuit 19B and to even input terminal 14*b* of BE-NAND circuit 24B thus causing BE-NAND circuit 24B to change its output signal from "0" to "1". Thus, B-AND circuit 7B supplies a signal "1" to input terminal $J_7$ since odd input terminal 13*b* is supplied with a signal "1" from forward input conductor F and the output signal of BU-NAND circuit 23B is still "1." In brief, forward trigger pulse No. 1 switches or reverses flip-flops $FF_1$ and $FF_6$ and as a result of the reversal of J-K flip-flop $FF_1$, the output signal from A-AND circuit 2A is changed from "0" to "1" whereas the output signal from B-AND circuit 2B is changed from "1" to "0" whereby input terminal $K_2$ receives a significant voltage, i.e. signal "1" instead of input terminal $J_2$. In the same manner, input terminal $J_7$ of J-K flip-flop $FF_7$ receives a signal "1" instead of its input terminal $K_7$.

When the operation caused by the forward trigger pulse No. 1 has been completed a forward trigger pulse No. 2 is applied to the pulse motor drive system embodying this invention. Upon application of the forward trigger pulse No. 2 to trigger terminals $T_1$ through $T_{10}$ inclusive through input trigger conductor $\overline{T}$, J-K flip-flops $FF_2$ and $FF_7$ will be reversed so as to generate output signals "1" at their output terminals $\overline{Q}_2$ and $Q_7$ respectively. However, the other flip-flops $FF_1$, $FF_3$, $FF_4$, $FF_5$, $FF_6$, $FF_8$, $FF_9$ and $FF_{10}$ are maintained in their previous state i.e. J-K flip-flops $FF_3$, $FF_4$, $FF_5$ and $FF_6$ are furnished with input signals "1" at their input terminals $J_3$, $J_4$, $J_5$and $J_6$to produce output signals "1" at their respective output terminals $Q_3$, $Q_4$, $Q_5$ and $Q_6$ and J-K flip-flops $FF_8$, $FF_9$, $FF_{10}$, and $FF_1$ are supplied with input signals "1" at their input terminals $K_8$, $K_9$, $K_{10}$ and $K_1$ to produce output signals "1" at their output terminals $\overline{Q}_8$, $\overline{Q}_9$, $\overline{Q}_{10}$ and $\overline{Q}_1$, respectively. Thus, output signals "1" are supplied to the elective pulse motor from output conductors II, III and IV connected to output terminals $Q_3$, $Q_5$ and $Q_7$, thus energizing coils 102, 103 and 104. As a result of the reversal of the J-K flip-flop $FF_2$, the signal supplied from A-AND circuit 3A to input terminal $K_3$ of J-K flip-flop $FF_3$ is changed from "0" to "1" since the output signal of AU-NAND circuit 15A is still "1" and the output signal of AE-NAND circuit 16A is changed from "0" to "1" by the change of output signal "0" from the output terminal $Q_2$ to the even input terminal 6*a*. On the other hand, the signal supplied to input terminal $J_3$ of J-K flip-flop $FF_3$ from B-AND circuit 3B is changed from "1" to "0" since the output signal of BU-NAND circuit 15B is still "1" and the output signal of BE-NAND circuit 16B has been changed from "1" to "0" due to the change in the output signal "1" from the output terminal $\overline{Q}_2$ to even input terminal 6*b* of BE-NAND circuit 16B.

Similarly, as a result of the reversal of J-K flip-flop $FF_7$, the signal supplied from A-AND circuit 8A to input terminal $K_8$ of J-K flip-flop $FF_8$ is changed from "1" to "0" since the output signal of AU-NAND circuit 25A is still "1" whereas the output of AE-NAND circuit 26A has been changed from "1" to "0" since both even and odd input terminals 15*a* and 16*a* of NAND circuit 26A are supplied with signals "1" from output terminal $Q_7$ and forward input conductor F, respectively. On the other hand the output signal of B-AND circuit 8B supplied to input terminal $J_8$ of J-K flip-flop $FF_8$ is changed from "0" to "1" since the output terminal of BU-NAND circuit 25B is still "1" and the output signal of BE-NAND circuit 26B has been changed from "0" to "1" because odd input terminal 15*b* is supplied with a signal "1" from forward input conductor F while input terminal 16*b* with a signal "0" from output terminal $\overline{Q}_7$. Accordingly, when J-K flip-flops $FF_2$ and $FF_7$ are reversed by the action of a forward trigger pulse No. 2, their input terminals which are applied with signals "1" will be changed from $J_3$ to $K_3$ and from $K_8$ to $J_8$, respectively.

Upon completion of the operation caused by the trigger pulse No. 2 a forward trigger pulse No. 3 is supplied to the pulse motor drive system of this invention. When a trigger pulse No. 3 is applied to trigger input terminals $T_1$ through $T_{10}$ inclusive, J-K flip-flops $FF_3$ and $FF_8$ are reversed in the same manner as has been described in connection with forward trigger pulse No. 1 and No. 2 whereby the output terminals for producing signals "1" are switched from $Q_3$ to $\overline{Q}_3$ and from $\overline{Q}_8$ to $Q_8$, respectively. Therefore, output signals "1" supplied to the pulse motor are obtained on output conductors III and IV to energize coils 103 and 104 and the input terminals of J-K flip-flops $FF_4$ and $FF_9$ which are supplied with the signal "1" are changed from $J_4$ to $K_4$ and from $K_9$to $J_9$ to prepare J-K flip-flops $FF_4$ and $FF_9$ for the reversal caused by a forward trigger pulse No. 4.

In this manner, two J-K flip-flops are reversed by a forward trigger pulse so that each of two other J-K flip-flops immediately to the right of said first-mentioned two flip-flops are switched to other state to receive signals "1" to prepare for a next forward trigger pulse. Therefore, while a signal "1" is being applied through forward signal input conductor F, when forward trigger pulses No. 1 through No. 10 inclusive are successively applied to trigger input terminals $T_1$ through $T_{10}$ inclusive of the J-K flip-flops, the output signals from output terminals $Q_1$ through $Q_{10}$ inclusive will change according to the first chart shown in FIG. 2. As will be noted from the first chart output signals from respective output terminals caused by a forward trigger pulse No. 10 are the same as in the initial condition, that is the reset condition. Therefore, when the next trigger pulse or a forward trigger pulse No. 11 is applied to respective trigger input terminals subsequent to forward trigger pulse No. 10, then output signals from output terminals $Q_1$ through $Q_{10}$ inclusive will be changed to the same conditions as when trigger pulse No. 1 was applied.

As long as forward trigger pulses are supplied, output signals shown in the first chart are repeated every 10 forward trigger pulses so that the signals supplied to the pulse motor from output terminals $Q_1$, $Q_3$, $Q_5$, $Q_7$ and $Q_9$ through output conductors I, II, III, IV and V will change according to a second chart shown in FIG. 3. The second chart shows that two signals "1" and three signals "1" are obtained alternately to energize two coils and three coils according to the same sequence.

Suppose now that a signal "1" is supplied to reverse signal input conductor F subsequent to forward trigger pulse No. 3 for the purpose of rotating the pulse motor in the reverse direction. Input terminals connected to reverse signal input conductor R, i.e. even input terminals 2*a'*, 4*a'*, 6*a'*, 8*a'*, 10*a'*, 12*a'*, 14*a'*, 16*a'*, 18*a'* and 20*a'* of AU-NAND circuits and even input terminals a 2*b'*, 4*b'*, 6*b'*, 8*b'*, 10*b'*, 12*b'*, 14*b'*, 16*b'*, 18*b'* and 20*b'* of BU-NAND circuits are supplied with signals "1". It is to be remembered that application of trigger pulse No. 3 results in the generation of output signals "1" at output terminals $\overline{Q}_1$, $\overline{Q}_2$, $\overline{Q}_3$, $Q_4$, $Q_5$, $Q_6$, $Q_7$, $Q_8$, $\overline{Q}_9$ and $\overline{Q}_{10}$ and output signals "0" at the output terminals $Q_1$, $Q_2$, $Q_3$, $\overline{Q}_4$, $\overline{Q}_5$, $\overline{Q}_6$, $\overline{Q}_7$, $\overline{Q}_8$, $Q_9$ and $Q_{10}$. Odd input terminals 5*a'*, 7*a'*, 9*a'*, 11*a'* and 13*a'* of AU-NAND circuits and odd input terminals 1*b'*, 3*b'*, 15*b'*, 17*b'* and 19*b'* of BU-NAND circuits which are associated with output terminals $Q_4$, $Q_5$, $Q_6$, $Q_7$, $Q_8$, $\overline{Q}_2$, $\overline{Q}_3$, $\overline{Q}_8$, $\overline{Q}_{10}$and $\overline{Q}_1$, respectively, are supplied with signals "1." The other odd input terminals 1*a'*, 3*a'*, 15*a'*, 17*a'* and 19*a'* of AU-NAND circuits and the other odd input terminals 5*b'*, 7 *b'*, 9*b'* and 13*b'* which are associated with output terminals $Q_2$, $Q_3$, $Q_9$, $Q_{10}$, Q, $\overline{Q}_4$, $\overline{Q}_5$, $\overline{Q}_6$, $\overline{Q}_7$ and $\overline{Q}_8$, respectively, are supplied with signals"0."Accordingly, AU-NAND circuits 11A, 13A, 25A, 27A and 29A and BU-NAND circuits 15B, 17B, 19B, 21B and 23B generate signals"1"since they are not simultaneously supplied with signals"1"at their even and odd input terminals. On the other hand, AU-NAND circuits 15A, 17A, 19A, 21A and 23A and BU-NAND circuits 11B, 13B, 25B, 27B and 29B produce no significant voltage or signal "0"

because they are supplied with signals "1" at their even and odd input terminals simultaneously. Furthermore, all AE-NAND circuits 12A, 14A, 16A, 18A, 20A, 22A, 24A, 26A, 28A and 30A and all BE-NAND circuits 12B, 14B, 16B, 18B, 20B, 22B, 24B, 26B, 28B and 30B produce signals "1" since odd input terminals 1*a*, 3*a*, 5*a*, 7*a*, 9*a*, 11*a*, 13*a*, 15*a*, 17*a* and 19*a* of AE-NAND circuits and odd input terminals 1*b*, 3*b*, 5*b*, 7*b*, 9*b*, 11*b*, 13*b*, 15*b*, 17*b* and 19*b* of BE-NAND circuits are connected to forward signal input conductor F which is not supplied with a signal "1" at this time. Accordingly, A-AND circuits 1A, 2A, 8A, 9A and 10A and B-AND circuits 3B, 4B, 5B, 6B and 7B generate signals "1" respectively by the simultaneous application of signals "1" at both of their input terminals, thus applying signals "1" to associated input terminals $K_1$, $K_2$, $K_8$, $K_9$, $K_{10}$, $J_3$, $J_4$, $J_5$, $J_6$ and $J_7$. The other A-AND circuits 3A, 4A, 5A, 6A and 7A and the other B-AND circuits 1B, 2B, 8B, 9B and 10B generate signals "0" whereby input terminals $K_3$, $K_4$, $K_5$, $K_6$, $K_7$, J, $J_2$, $J_8$, $J_9$ and $J_{10}$ associated therewith are supplied with signals "0." Summarizing the above, when a signal "1" is applied to reverse signal input conductor R instead of forward signal input conductor F subsequent to the trigger pulse No. 3, input terminals which have received signals "1" are changed from $K_3$, $K_4$, $J_8$ and $J_9$ to $J_3$, $J_4$, $K_8$ and $K_9$. When a reverse trigger pulse No. 1 (by the term "reverse trigger pulse"is meant a trigger pulse which is applied to trigger input conductor $\overline{T}$ while a reverse signal "1" is being applied to reverse signal input conductor R) is applied to trigger input terminals $T_1$ through $T_{10}$ inclusive of the J-K flip-flops, J-K flip-flops $FF_3$ and $FF_8$ are switched to produce signals "1" from their output terminals $Q_3$ and $\overline{Q}_8$, respectively, due to the application of the signals "1" to input terminals $J_3$ and $K_8$. However, the other J-K flip-flops $FF_1$, $FF_2$, $FF_4$, $FF_5$, $FF_6$, $FF_7$, $FF_9$, and $FF_{10}$ will not be reversed since they are supplied with signals which correspond to output terminals producing signals "1" At this time, the output signals "1" which are applied to the pulse motor are obtained from output conductors II, III and IV connected to output terminals $Q_3$, $Q_5$ and $Q_7$ thus energizing coils 102, 103 and 104 of the motor. Therefore, output signals from output terminals of all J-K flip-flops are identical to those generated when a forward trigger No. 2 is applied to forward signal input conductor F. As a result of the application of a reverse trigger pulse No. 1, input terminals of two J-K flip-flops $FF_2$ and $FF_7$ to be supplied with signals "1" are changed from $K_2$ to $J_2$ and from $J_7$ to $K_7$ to prepare for a reverse trigger pulse No. 2. Upon application of the reverse trigger pulse No. 2 to trigger pulse input conductor $\overline{T}$, J-K flip-flops $FF_2$ and $FF_7$ are switched whereby output signals from output terminals of all J-K flip-flops become identical to those generated when the forward trigger pulse No. 1 was applied to trigger input terminal $\overline{T}$ and when input terminals $J_1$ and $K_6$ were supplied with signals "1" instead of input terminals $K_1$ and $J_6$. In this manner, to rotate the pulse motor in the reverse direction the output signals from J-K flip-flops are instantly switched back by the reverse trigger pulses without any troubles even if the forward trigger pulse was changed to the reverse trigger pulse in a very short time. FIG. 4 is a third chart showing states of the output signals from output terminals $Q_1$ through $Q_{10}$ inclusive when reverse trigger pulses from No. 1 to No. 10 are successively applied. These states of output signals are obtained repeatedly every 10 reverse trigger pulses. FIG. 5, is a fourth chart showing the states of output signals appearing at output conductors I, II, III, IV and V connected to output terminals, that is the sequence of energization of the coils provided for the pulse motor shown in FIG. 6. As can be noted from the fourth chart, two coils and three coils are energized alternately and the sequence of the energization is just opposite to that of the second chart shown in FIG. 3.

Figure 7:
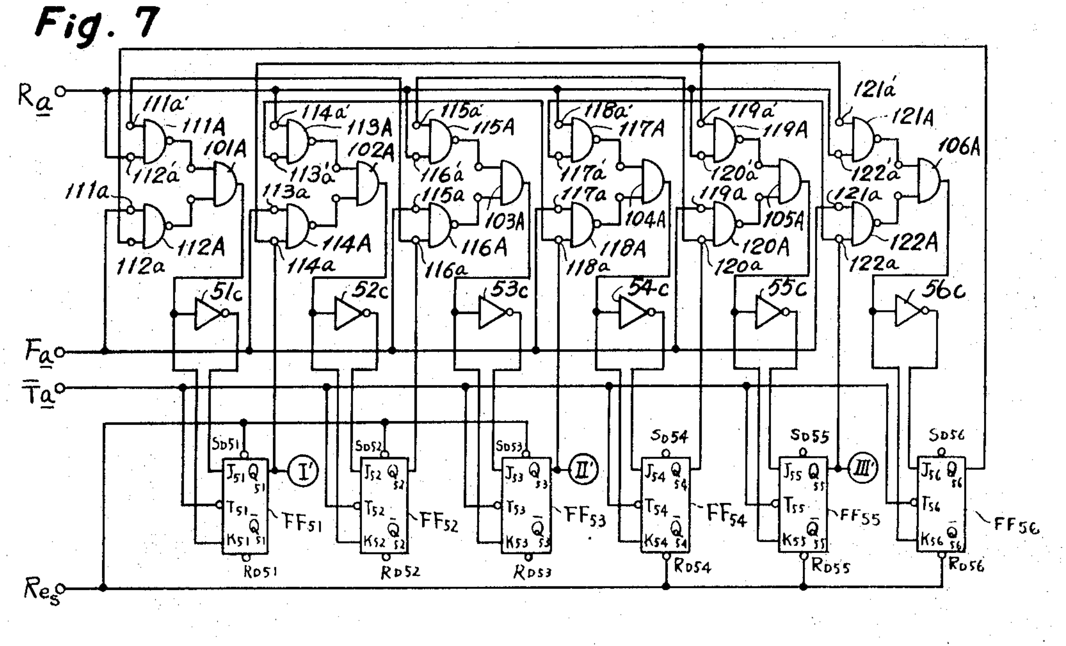
FIG. 7 shows a block diagram of a second embodiment of the pulse motor drive system embodying this invention.

Referring now to FIG. 7, there is shown a modified pulse motor drive system of this invention for controlling an electric pulse motor provided with three coils by alternately energizing one and two thereof. In this embodiment, flip-flops $FF_{51}$, $FF_{52}$, $FF_{53}$, $FF_{54}$, $FF_{55}$ and $FF_{56}$ have the same construction and operate in the same manner as flip-flop $FF_1$ used in the first embodiment and these flip-flops are provided with output terminals $Q_{51}$, $Q_{52}$, $Q_{53}$, $Q_{54}$, $Q_{55}$ and $Q_{56}$, output terminals or complementary output terminals $\overline{Q}_{51}$, $\overline{Q}_{52}$, $\overline{Q}_{53}$, $\overline{Q}_{54}$, $\overline{Q}_{55}$ and $\overline{Q}_{56}$, input terminals $J_{51}$, $J_{52}$, $J_{53}$, $J_{54}$, $J_{55}$ and $J_{56}$, input terminals or complementary input terminals $K_{51}$, $K_{52}$, $K_{53}$, $K_{54}$, $K_{55}$ and $K_{56}$, set terminals $SD_{51}$, $SD_{52}$, $SD_{53}$, $SD_{54}$, $SD_{55}$ and $SD_{56}$, reset terminals $RD_{51}$, $RD_{52}$, $RD_{53}$, $RD_{54}$, $RD_{55}$ and $RD_{56}$ and trigger input terminals $T_{51}$, $T_{52}$, $T_{53}$, $T_{54}$, $T_{55}$ and $T_{56}$, respectively. A forward signal input conductor F*a* is connected to odd input terminals 111*a*, 113*a*, 115*a*, 117*a*, 119*a* and 121*a* of respective AE-NAND gate circuits 112A, 114A, 116A, 118A, 120A and 122A. A reverse signal input conductor R*a* is connected to even input terminals 112*a'*, 114*a'*, 116*a'*, 118*a'*, 120*a'*, and 122*a'* of respective AU-NAND circuits 111A, 113A, 115A, 117A, 119A and 121A. Output terminals of all AE-NAND circuits are connected to AND circuits 101A, 102A, 103A, 104A, 105A and 106A, respectively. Output terminals AU-NAND circuits 111A, 113A, 115A, 117A, 119A and 121A are also connected to AND circuits 101A, 102A, 103A, 104A, 105A and 106A, respectively. Furthermore, these AND circuits are respectively connected to input terminals, $J_{51}$ and $K_{51}$, $J_{52}$ and $K_{52}$, $J_{53}$ and $K_{53}$, $J_{54}$ and $K_{54}$, $J_{55}$ and $K_{55}$, and $J_{56}$ and $K_{56}$ to apply output signals thereto. NOT circuits 51C, 52C, 53C, 54C, 55C and 56C are interposed between AND circuit 101A and input terminal $J_{51}$, AND circuit 102A and input terminal $J_{52}$, AND circuit 103A and input terminal $J_{53}$, AND circuit 104A and input terminal $J_{54}$, AND circuit 105A and input terminal $J_{55}$ and between AND circuit 106A and input terminal $J_{56}$, respectively. Each one of the NOT circuits has the same construction and operation and functions to invert the signal applied by the NAND circuit, that is, it produces an output signal "1" when a signal "1" is not applied thereto whereas it produces an output signal "0" when a signal "1" is applied thereto. A trigger input conductor $\overline{T}a$ for passing trigger pulses is connected to trigger input terminals $T_{51}$, $T_{52}$, $T_{53}$, $T_{54}$, $T_{55}$ and $T_{56}$ of the J-K flip-flops. An input conductor R*es* for set and reset signals is connected is connected to set terminals $SD_{51}$, $SD_{52}$ and $SD_{53}$ of respective flip-flops and to rest terminals $RD_{54}$, $RD_{55}$ and $RD_{56}$ of respective flip-flops. Output terminals $Q_{51}$, $Q_{52}$, $Q_{53}$, $Q_{54}$, $Q_{55}$ and $Q_{56}$ are respectively connected to even input terminals 114*a*, 116*a*, 118*a*, 120*a*, 122*a* and 112*a* of respective AE-NAND circuits 114A, 116A, 118A, 120A, 122A and 112A and thence to odd input terminals 121*a'*, 111*a'*, 115*a'*, 117*a'* and 119*a'* of respective AU-NAND circuits 121A, 113A, 115A, 117A, and 119A. Output terminals $Q_{51}$, $Q_{53}$ and $Q_{55}$ are further connected to an electric pulse motor of the conventional type, not shown, though output conductors I', II' and III'. The pulse motor is provided with three stationary coils and a rotor which is driven by alternately energizing one coil and two coils.

The operation of this modified pulse motor drive system is as follows: Application of a reset pulse signal to reset conductor *Res* causes J-K flip-flops $FF_{51}$, $FF_{52}$ and $FF_{53}$ to set and the other J-K flip-flops $FF_{54}$, $FF_{55}$ and $FF_{56}$ to reset. In the set and reset conditions, output signals "1" are generated at output terminals $Q_{51}$, $Q_{52}$, $Q_{53}$, $\overline{Q}_{54}$, $\overline{Q}_{55}$ and $\overline{Q}_{56}$ of J-K flip-flops whereas output signals "0" are generated at output terminals $\overline{Q}_{51}$, $\overline{Q}_{52}$, $\overline{Q}_{53}$, $Q_{54}$, $Q_{55}$ and $Q_{56}$ thereof. Accordingly, the output signals "1" appearing at output terminals $Q_{51}$ and $Q_{53}$ are applied to the pulse motor to energize its two coils through output conductors I' and II'. Furthermore, the output signals "1"appearing at output terminals $Q_{51}$,$Q_{52}$ and $Q_{53}$ are applied to even input terminals 114*a*, 116*a* and 118*a* of respective AE NAND circuits 114A, 116A and 118A, and thence to odd input terminals 121*a'*, 111*a'*and 113*a'*of AU-NAND circuits 121A, 111A and 113A, respectively. While these NAND circuits are in their set and reset conditions, when input signals "1" and "0" are applied to forward signal input conductor F*a* and reverse signal input conductor R*a*, respectively, the input signals "1" are supplied to odd input terminals 111*a*, 113*a*, 115*a*, 117*a*, 119*a* and 121*a* of AE-NAND circuits, respectively. Accordingly, AE-NAND circuits 114A, 116A, and 118A generate signals "0" since these NAND circuits will simultaneously be supplied with signals "1" to their even and odd input terminals. The other AE-NAND circuits 112A, 120A and 122A generate signals "1" since these NAND circuits will not simultaneously be applied with signals "1" at both of their input terminals. On the other hand, all AU-NAND circuits 111A, 113A, 115A, 117A, 119A and 121A generate output signals "1" since their even input terminals 112*a'*, 114*a'*, 116*a'*, 118*a'*, 120*a'* and 122*a'* are connected to reverse signal input conductor R*a* which is not applied with any significant voltage during the operation of the forward rotation. AND circuits 101A, 105A and 106A which are simultaneously supplied with signals "1" from associated NAND circuits generate signals "1" which are applied to input terminals $K_{51}$, $K_{55}$ and $K_{56}$. The other AND circuits 102A, 103A and 104A which are supplied with signals "1" alone from associated AU-NAND circuits 113A, 115A and 117A generate signals "0" whereby NOT circuits 52C, 53C and 54C generate signals "1" which are applied to input terminals $J_{52}$, $J_{53}$ and $J_{54}$, respectively.

Thereafter, when a forward trigger pulse No. 1 (as above described, the term "forward trigger pulse" means a trigger pulse applied to trigger input conductor $\bar{T}a$ when a forward signal is being applied to forward signal input conductor F*a*" is applied to trigger input terminals $T_{51}$, $T_{52}$, $T_{53}$, $T_{54}$, $T_{55}$ and $T_{56}$, output terminals of J-K flip-flops $FF_{51}$ and $FF_{54}$ will be switched to generate signals "1" from output terminals $Q_{51}$ to $\bar{Q}_{51}$ and output terminals $\bar{Q}_{54}$ to $Q_{54}$, respectively, since J-K flip-flops $FF_{51}$ and $FF_{54}$ are supplied with signals "1" at their input terminals $K_{51}$ and $J_{54}$, respectively. However, the other J-K flip-flops $FF_{52}$, $FF_{53}$, $FF_{55}$ and $FF_{56}$ are maintained in their previous conditions since they are supplied with signals "1" to their input terminals $J_{52}$, $J_{53}$, $K_{55}$ and $K_{56}$ to produce output signals "1" at their output terminals $Q_{52}$, $Q_{53}$, $\bar{Q}_{55}$ and $\bar{Q}_{56}$, respectively. Therefore, an output signal "1" which is applied to the pulse motor having three coils is obtained from output terminal $Q_{53}$ via output conductor II'. As a result of switching or reversal of flip-flop $FF_1$, the output signal of AND-circuit 102A is changed from "0" to "1" since the output signal from output terminal $Q_{51}$ is changed from "1" to 1 with a result that NAND circuit 114A generates an output signal "1" which is supplied to AND circuit 102A. Similarly, as a result of the reversal of J-K flip-flop $FF_{54}$, the output signal of AND circuit 105A is caused to change from "1" to "0" whereby NOT circuit 55*c* supplies signal "1" to the input terminal $J_{55}$ since the output signal from the output terminal $Q_{54}$ is changed from "0" to "1" with a result that NAND circuit 120 changes its output signal from "1" to "0." Upon application of a forward trigger pulse No. 2 upon trigger input terminals $T_{51}$, $T_{52}$, $T_{53}$, $T_{54}$, $T_{55}$ and $T_{56}$ through trigger input conductor $\bar{T}a$ subsequent to the application of a forward trigger pulse No. 1 J-K flip-flops $FF_{52}$ and $FF_{55}$ are caused to reverse at this time so as to generate output signals "1" at their output terminals $\bar{Q}_{52}$ and $Q_{55}$, respectively whereas the other flip-flops $FF_{51}$, $FF_{53}$, $FF_{54}$ and $FF_{56}$ are maintained in the previous states. At this time, the output signals "1" are produced from output terminals $Q_{53}$ and $Q_{55}$ and are applied to the pulse motor through output conductors II' and III'. Input terminals for receiving signals "1" are changed from input terminals $J_{53}$ and to input terminals $K_{53}$ and $J_{56}$, respectively. In this manner, when a forward trigger pulse is supplied to trigger input conductor $\bar{T}a$, two of J-K flip-flops $FF_{51}$, $FF_{52}$, $FF_{53}$, $FF_{54}$, $FF_{55}$ and $FF_{56}$ are reversed and the input terminals of the J-K flip-flops to the right of the reversed J-K flip-flops are switched to receive signals "1" to prepare for the reversal caused by a next succeeding forward trigger pulse. Combinations of a single output signal "1" and two output signals "0" and of a single output signal "0" and two output signals "1" are obtained alternately from output conductors I', II' and III' to drive the pulse motor having three coils. Upon application of a reverse trigger pulse upon trigger input conductor $\bar{T}a$, two of J-K flip-flops $FF_{51}$, $FF_{52}$, $FF_{53}$, $FF_{54}$, $FF_{55}$ and $FF_{56}$ are reversed and the input terminals of J-K flip-flops to the lift of the reversed flip-flops are switched to receive signals "1" to prepare for the reversal caused by a next succeeding reverse trigger pulse. In this manner, output signals are regularly produced by the reverse trigger pulses from output conductors I', II' and III' to drive the pulse motor in the reverse direction.

While the invention has been shown and described in terms of preferred embodiments thereof, it should be understood that the invention is by no means limited thereto and that many changes and modifications will be obvious to one skilled in the art without departing from the spirit and scope of the invention.

What is claimed is:

1. A pulse motor drive system for controlling the direction of rotation of a pulse motor having a plurality of driving coils comprising a plurality of flip-flops capable of changing output signals thereof in accordance with input signals supplied to said flip-flops, each one of said flip-flops being provided with a pair of input terminals and at least one output terminal, the number of said flip-flops being twice the number of said driving coils; a plurality of gate circuits interconnecting said flip-flops in ring formation and being responsive to output signals from the output terminals of each flip-flop to supply input signals to the input terminals of the next successive flip-flop in accordance with said output signals from the next preceding flip-flop; conductors connected to said output terminal of alternate ones of said flip-flops to supply output signals from said last-mentioned output terminals to said driving coils of said pulse motor;

a reset conductor connected to each of said flip-flops for setting a first half of said flip-flops and for resetting a second half of said flip-flops upon the occurrence of a reset signal;

a trigger input conductor connected to supply trigger pulses to each of said flip-flops to switch output signals of a flip-flop in said first half and a flip-flop in said second half;

a forward signal input conductor connected to said gate circuits to supply a signal for commanding forward rotation of said pulse motor; and a reverse signal input conductor connected to said gate circuits to supply a signal for commanding reverse rotation of said pulse motor.

2. A pulse motor drive system according to claim 1, wherein each one of said gate circuits comprises a first gate circuit and a second gate circuit, said first gate circuit including a first NAND circuit, a second NAND circuit and an AND circuit, said AND circuit being responsive to output signals from said first and second NAND circuits and capable of supplying signals to the input terminal of one of said flip-flops, said first NAND circuit being connected to said forward input conductor and to the output terminal of the next preceding flip-flop, said second NAND circuit being connected to said reverse signal input conductor and to the output terminal of the next succeeding flip-flop, said second gate circuit being provided between said one of said flip-flops and an adjacent flip-flop.

3. The pulse motor drive system according to claim 2, wherein said second gate circuit is similar to said first gate circuit.

4. The pulse motor drive system according to claim 2, wherein said second gate circuit is connected as a NOT circuit between said one of said flip-flops and said AND circuit for inverting output signals from said AND circuit.

PO-1050
(5/69)

UNITED STATES PATENT OFFICE
CERTIFICATE OF CORRECTION

Patent No. 3,614,580 Dated October 19, 1971

Inventor(s) Kunihiko Eto

It is certified that error appears in the above-identified patent and that said Letters Patent are hereby corrected as shown below:

IN THE PATENT:

Column 1, line 7, for "mphase" read --m phase--;

line 21, for "input" read --output--;

line 25, for "of lead" read --or lead--;

line 29, for "half of flip-flop circuits"read --half of the flip-flop circuits--;

Column 2, line 30, for "terminals b, 3b," read --terminals 1b, 3b--;

line 33, for "circuits 12B,...20B, 22B, 26B" read --circuits 12B,...20B, 22B, 24B, 26B---;

line 35, for "The terms odd" read --The terms "odd,"--;

line 39, for "minals 2a'4a'6a...and 20a'" read --minals 2a', 4a', 6a',...and 20a'-- line 42, for "terminals 2b'4b'6b'...and 20b'" read --terminals 2b', 4b', 6b',...and 20b'--;

line 44, for "terminals 2a'4a'6a'8a'10a'" read --terminals 2a', 4a', 6a', 8a', 10a'-- line 45, for "12a' 14a' 16a' 18a" read --12a', 14a', 16a', 18a'-- line 45, for "6b'8b'10b'12B'14b'16b'" read --6b', 8b', 10b', 12b', 14b', 16b'-- line 63, for"circuits 1-A," read --circuits 1A,--

PO-1050
(5/69)

UNITED STATES PATENT OFFICE
CERTIFICATE OF CORRECTION

Patent No. 3,614,580 Dated October 19, 1971

Inventor(s) Kunihiko Eto

It is certified that error appears in the above-identified patent and that said Letters Patent are hereby corrected as shown below:

Page 2

Column 2 - continued line 66, for "$A_1$'$A_2$'$A_3$'$A_4$'" read --$A_1$', $A_2$', $A_3$', $A_4$',--
line 66, for "$A_7$" read --$A_7$'--;
line 68, for "circuits respective-" read --circuits are respective- --;
line 69, for "$B_8$" read --$B_8$,--;
line 70, omit the comma "," in the first instance;
line 70, for "$B_1$'$B_2$'...'$B_8$" read --$B_1$', $B_2$', ... $B_8$',--;
line 71 for "'$B_9$'" read --$B_9$'--;

Column 3 line 1, for "$J_4$," read --$J_4$,--;
line 5, for "-$Q_1$," read --$Q_1$,--;

Column 4 line 46, "$Q_6$" in the first instance should read --$\bar{Q}_6$--;
line 58, for "terminals" read --terminal--;

Column 5 line 1, for "$\bar{Q}_6$" read --$Q_6$--;
line 5, for "24A (after '0') is supplied" read --24A is supplied--;
line 43, for "$Q_3$" read --$Q_3$,--;
line 44, omit the comma "," in the first instance;

PO-1050
(5/69)

UNITED STATES PATENT OFFICE
CERTIFICATE OF CORRECTION

Patent No. 3,614,580 : Dated October 19, 1971

Inventor(s) Kunihiko Eto

It is certified that error appears in the above-identified patent and that said Letters Patent are hereby corrected as shown below:

Page 3

Column 6 line 63, for "$Q_8$" in the second instance, read --$Q_9$--;
line 66, for "7b', 9b'" read --7b', 9b', 11b'---;

Column 7 line 18, for "$k7$," read --$K_7$,--;
line 34, for "signals which" read --signals "1" at their input terminals K1, K2, J4, J5, J6, J7, K9 and K10--;
line 62, for "10" read --ten--;

Column 8 line 45, for "111a', 115a'" read --111a', 113a', 115a'--;
line 46, for "121A, 113A" read --121A, 111A, 113A--;
line 48, for "though" read --through--;

Column 9 line 24, for "conductor Fa" " read --conductor Fa)--;

Signed and sealed this 18th day of July 1972.

(SEAL)
Attest:

EDWARD M.FLETCHER,JR.
Attesting Officer

ROBERT GOTTSCHALK
Commissioner of Patents